United States Patent
Desai et al.

(10) Patent No.: US 9,551,179 B2
(45) Date of Patent: Jan. 24, 2017

(54) EMERGENCY EXIT ARRANGEMENT

(71) Applicant: TATA TECHNOLOGIES PTE LIMITED, Singapore (SG)

(72) Inventors: Amar Mutalik Desai, Karnataka (IN); Prashant Topalkatti, Karnataka (IN); Upender Rao Gade, Telangana (IN); Gopal Musale, Telangana (IN)

(73) Assignee: Tata Technologiė Pte Limited, Singapore (SG)

( * ) Notice: Subject to any disclaimer, the term of this patent is extended or adjusted under 35 U.S.C. 154(b) by 0 days.

(21) Appl. No.: 14/731,413

(22) Filed: Jun. 5, 2015

(65) Prior Publication Data
US 2016/0298378 A1    Oct. 13, 2016

(30) Foreign Application Priority Data

Apr. 11, 2015 (IN) .......................... 1520/MUM/2015

(51) Int. Cl.
```
E06B 5/00      (2006.01)
E05C 1/10      (2006.01)
B60J 9/02      (2006.01)
```
(52) U.S. Cl.
CPC .. *E06B 5/00* (2013.01); *B60J 9/02* (2013.01); *E05C 1/10* (2013.01)

(58) Field of Classification Search
CPC .................. E06B 5/00; B60J 9/02; E05C 1/10
USPC .......................................................... 49/141
See application file for complete search history.

(56) References Cited

U.S. PATENT DOCUMENTS

| | | | | |
|---|---|---|---|---|
| 5,826,824 A | * | 10/1998 | Martin | B64C 1/32 244/129.3 |
| 5,839,230 A | * | 11/1998 | Licking | E05F 15/72 49/139 |
| 6,092,583 A | * | 7/2000 | Furusawa | E06B 3/80 160/330 |
| 6,427,383 B1 | * | 8/2002 | Brooks | B64C 1/32 49/141 |
| 6,474,705 B1 | * | 11/2002 | Mori | E02F 9/163 292/216 |
| 7,730,668 B2 | * | 6/2010 | Dankert | B61D 19/023 49/141 |
| 9,097,039 B2 | * | 8/2015 | Bar | B60J 7/1642 |
| 2003/0005635 A1 | * | 1/2003 | Haag | E05F 15/646 49/141 |
| 2006/0101718 A1 | * | 5/2006 | Fronz | B61D 19/008 49/141 |

(Continued)

FOREIGN PATENT DOCUMENTS

DK    FR 2273140 A1 * 12/1975 ............... E06B 5/00

*Primary Examiner* — Jerry Redman

(57) ABSTRACT

An emergency exit arrangement for a vehicle and or a building comprising of a plurality of spring pressured stud assembly having a plurality of locking pin in the upper region connected correspondingly to a plurality of rope which is connected to a first pulling device; a plurality of locking pin in the lower region connected correspondingly to a plurality of rope which is connected to a second pulling device. Sequential pulling of the first and the second pulling device ejects out the aperture cover. The pulling devices are electrical, operated by pressing a button; or through temperature sensor, impact sensor, pressure sensor, smoke sensor and or a combination thereof. The pulling devices are alternatively rotatable knobs. The aperture cover is easily mountable.

28 Claims, 16 Drawing Sheets

Section A-A

(56) References Cited

U.S. PATENT DOCUMENTS

| | | | |
|---|---|---|---|
| 2011/0289850 A1* | 12/2011 | Helms | B60J 1/085 49/141 |
| 2014/0259935 A1* | 9/2014 | Steger | B64C 1/32 49/141 |
| 2015/0028620 A1* | 1/2015 | Gerhardt | B60J 1/008 296/146.2 |
| 2015/0167378 A1* | 6/2015 | Malvey | E06B 5/167 49/141 |

* cited by examiner

Section A-A ional arrangement is not prior known. It is due to this reason that most vehicles and buildings provide a hammer like object to break the glass, instead of several known designs.

EMERGENCY EXIT ARRANGEMENT

FIELD OF THE INVENTION

The present invention relates to an exit arrangement and particularly to an emergency exit arrangement for a transport vehicles and buildings.

BACKGROUND OF THE INVENTION

Emergency exit windows are a safety requirement so that persons entrapped in an enclosure, whether a vehicle or a building, can free themselves by removing the covering matter, usually glass. In a way, any and every window, which is open-able in some easy way, can also serve the purpose of emergency exit. However, it is important that the opening is clear enough to facilitate quick and unhindered evacuation.

Patent GB1248307 discloses one of the early emergency windows for passenger vehicles. The ejection arrangement is compressed air based and is fairly complex in construction as well as functioning. Patent application number DE102006057288A1 discloses another emergency exit window which opens from inside as well as outside, though the opening remains partial, as also disclosed in CN103818220 as well as CN103847471. CN202879413 discloses a kind of belt alarming device for fast opening escape window, which opens partially. CN201428362Y disclose pressure sensitive fire escape.

Patent Publication No: US2011/0289850A1 discloses an emergency egress assembly which provides wider opening to exit than the normal window when the normal opening arrangement fails. The design is robust and needs elaborate linkages and dismantling. Patent Publication No: WO2013/184356 A1 discloses a speedier opening design. Both these disclosures are more suited for armored vehicles.

Patent Publication no. CN201442505U discloses a vehicular sealing window capable of performing quick escape, wherein the entire glass is removable by tearing the seal away.

Patent application No: GB2514673A discloses a concept of removing the window by deploying an unfastening device which could be triggered by heat, pressure, explosive to shatter the window pane; however the construction and operation of the unfastening device is difficult to gauge from this document. Also claimed is an escape chute for evacuation. Patent Application No: WO2006/103305 A1 (also published as EP1710105 B1) discloses an auto or manually ejecting emergency exit window using spring assisted braided wire actuated by actuation device. The document does not elaborate the mechanical arrangement nor actuation device for workability.

Modern transport vehicles as well as buildings have controlled temperature and other comfort parameters. Openings are for fitment of transparent material like glass, polycarbonate and the like, provided for cross visibility, sunshine et cetera. Consequently, the fitment of transparent material is generally of a permanent nature and is made to ensure proper insulation of environment of the transport vehicle or the building from outside. In such a case, using such opening as emergency exit warrants that the insulation of environment in the normal course is not compromised. Such an arrangement is not prior known. It is due to this reason that most vehicles and buildings provide a hammer like object to break the glass, instead of several known designs.

Breaking the glass is obviously not a comfortable option for passengers or occupants, given the trauma of situation warranting emergency evacuation.

Our design effectively addresses this gap.

OBJECTIVE OF THE INVENTION

The objective is to invent an emergency exit arrangement which is easy to be invoked.

Another objective is to invent an emergency exit arrangement which does not need aggressive action for enabling the arrangement.

Another objective is to invent an emergency exit arrangement which is actuable manually as well as automatically.

Yet another objective is to invent an emergency exit arrangement which is simple to assemble.

Yet another objective is to invent an emergency exit arrangement which in normal situation provides effective insulation of environment inside the vehicle or building with respect to outside.

SUMMARY OF THE INVENTION

The emergency exit arrangement has an aperture cover made of transparent material or non-transparent material, has at least an upper side and a lower side fixed on the aperture cover as described below. Correspondingly, an aperture in a vehicle or a building has a top base and a bottom base. When the aperture cover is mounted so as to cover the aperture, the top base is above the upper side and the bottom base is below the lower side, with a definite space of few centimeters in between the top base and the upper side. A plurality of spring pressured stud assemblies are provided between the top base of the aperture and the upper side of the aperture cover; and between the lower side of the aperture cover and the bottom base of the aperture. The spring pressured stud assemblies comprise of a plurality of compression spring, at least one stud, at least one locking pin and a seat. The seat is attached on the top base towards the upper side and on the bottom base towards the lower side.

The upper side as well as the lower side have a fixing face and an engagement face. The fixing faces are reliably fixed with the aperture cover. The engagement faces have a plurality of opening to insert the stud. The distance between the fixing face of the upper side and the engagement face of the upper side is adequate to facilitate insertion of the stud in the opening.

Each locking pin of the plurality of spring pressured stud assemblies is connected to a proximal end of a rope. A distal end of each rope, which is connected to the locking pin at its proximal end, provided in the spring pressured stud assembly provided between the top base and the upper side, is connected to a first pulling device. A distal end of each rope, which is connected to the locking pin at its proximal end, provided in the spring pressured stud assembly provided between the bottom base and the lower side, is connected to a second pulling device.

The aperture cover has a compressible gasket all along the periphery of the aperture cover.

To mount the aperture cover so as to close the aperture, the aperture cover is held touching to the top base and the bottom base such that the compressible gasket is deformed so as to effectively seal the gap. At the same time, the plurality of compression spring is trapped between the lower side and the bottom base after locating the plurality of compression spring at the plurality of anchor location on the seat. A downward force F1 is applied and the aperture cover is pressed down so as to overcome the upward force of the plurality of compression spring, and at the same time the stud is inserted through the opening in the lower side into the recess of the seat such that the hole provided on the stud is accessible from below the seat through the side recess. The locking pin inserted into the hole on the stud. The downward force F1 is then removed. The plurality of compression spring applies upward reactional force and holds the locking pin rigidly against the mating surface of the seat.

Next, the plurality of compression spring is trapped between the top base and the upper side after locating the plurality of compression spring at the plurality of anchor location, and an inward force F2 is applied so that the aperture cover is pressed from outside to inside so as to overcome the outward force of the plurality of compression spring, such that the hole provided on the stud is accessible from below the seat through the side recess. The locking pin is inserted into through the hole on the stud. The inward force F2 is then removed. The plurality of compression spring applies outward reactional force and holds the locking pin rigidly against the mating surface of the seat.

The plurality of locking pin is connected correspondingly to a plurality of rope at a proximal end of the plurality of the rope. The distal end of the plurality of rope in the upper region are connected to a first pulling device while the distal end of the plurality of rope in the lower region are connected to a second pulling device.

To release the aperture cover in situations of distress, the first pulling device pulls the plurality of rope from their distal end. The pulling action causes pulling out of all the locking pins on the upper region. The outward reactional force pushes away the fixing face of the upper side and consequently the aperture cover is pushed outwards. In this manner, the aperture cover becomes free from the upper region.

Next, the second pulling device pulls the plurality of rope from the distal region. The pulling action causes pulling out of all the locking pin on the lower region. The upward reactional force of the compression spring pushes up the engagement face of the lower side and consequently the aperture cover is pushed upwards. Since, the aperture cover is already free from the upper side; the aperture cover ejects up and then gravitationally falls out, leaving the aperture clear for exiting of persons.

As a preferred embodiment the first pulling device and the second pulling device are a solenoid operated plungers. The pulling devices have a solenoid. An electrical circuit is provided such that on pressing a push button, a relay is energized causing sequential pulling of the locking pins. In place of the push button, temperature sensor, smoke sensor, pressure sensor, impact sensor and or a combination of such sensors are provided whose output energizes the relay.

As another embodiment, the first pulling device and the second pulling device are a first rotatable Knob and a second rotatable knob, each having a cylindrical shaft. On turning the knobs clockwise, the distal end of the plurality of rope is made to wind on the cylindrical shaft, causing the plurality of locking pin to get pulled from the hole of the stem of the stud. By first turning the first rotatable knob and then turning the second rotatable knob, the aperture cover ejects up and then gravitationally falls out as described above.

BRIEF DESCRIPTION OF DRAWINGS

FIG. 2 gives a cross-sectional side view of the emergency exit arrangement in a vehicle or a building having a wall and an aperture cover, mounted, along with a compressible gasket, an inside and an outside of the vehicle or the building, and a space between a top base and an upper side bracket, while

DETAILED DESCRIPTION OF INVENTION

The following description of the preferred embodiment should not be construed to limit the invention or its application or uses.

Figure 1:
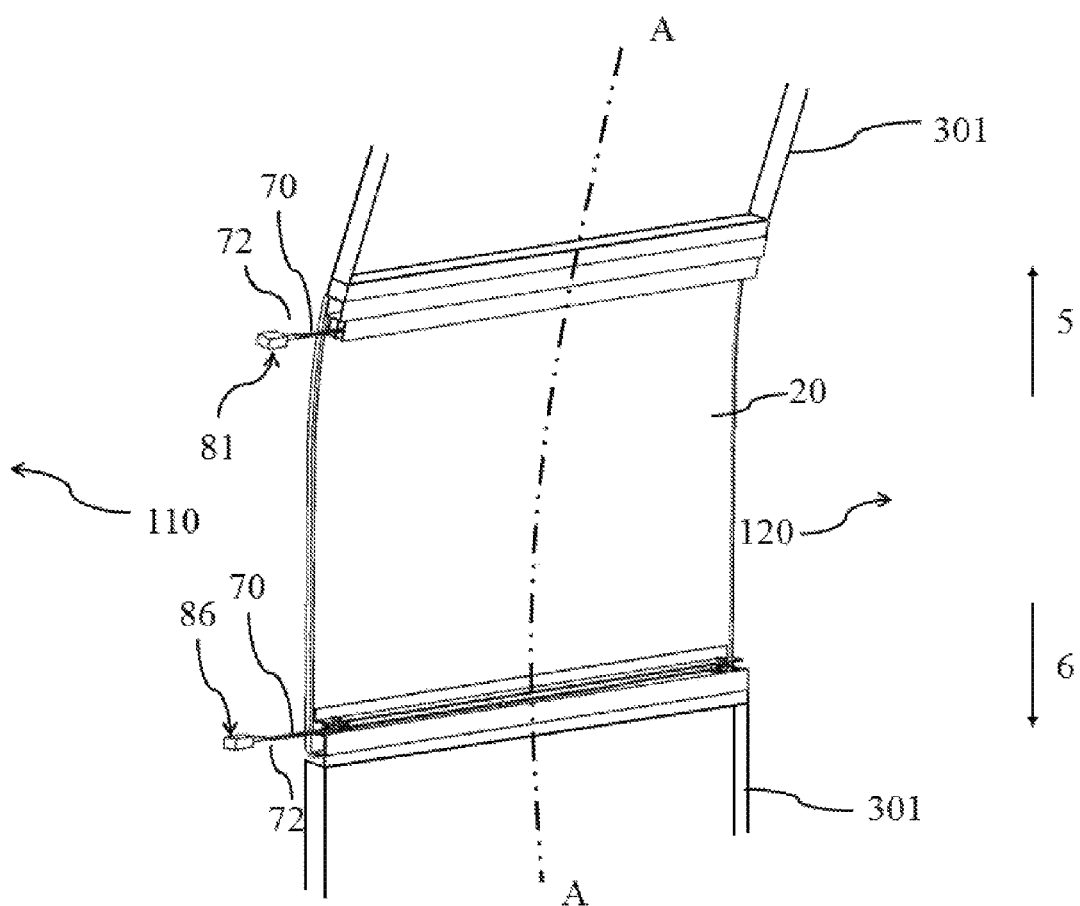
FIG. 1 gives an overview of an emergency exit arrangement with a first pulling device and a second pulling device connected to a plurality of rope.
Figure 2:
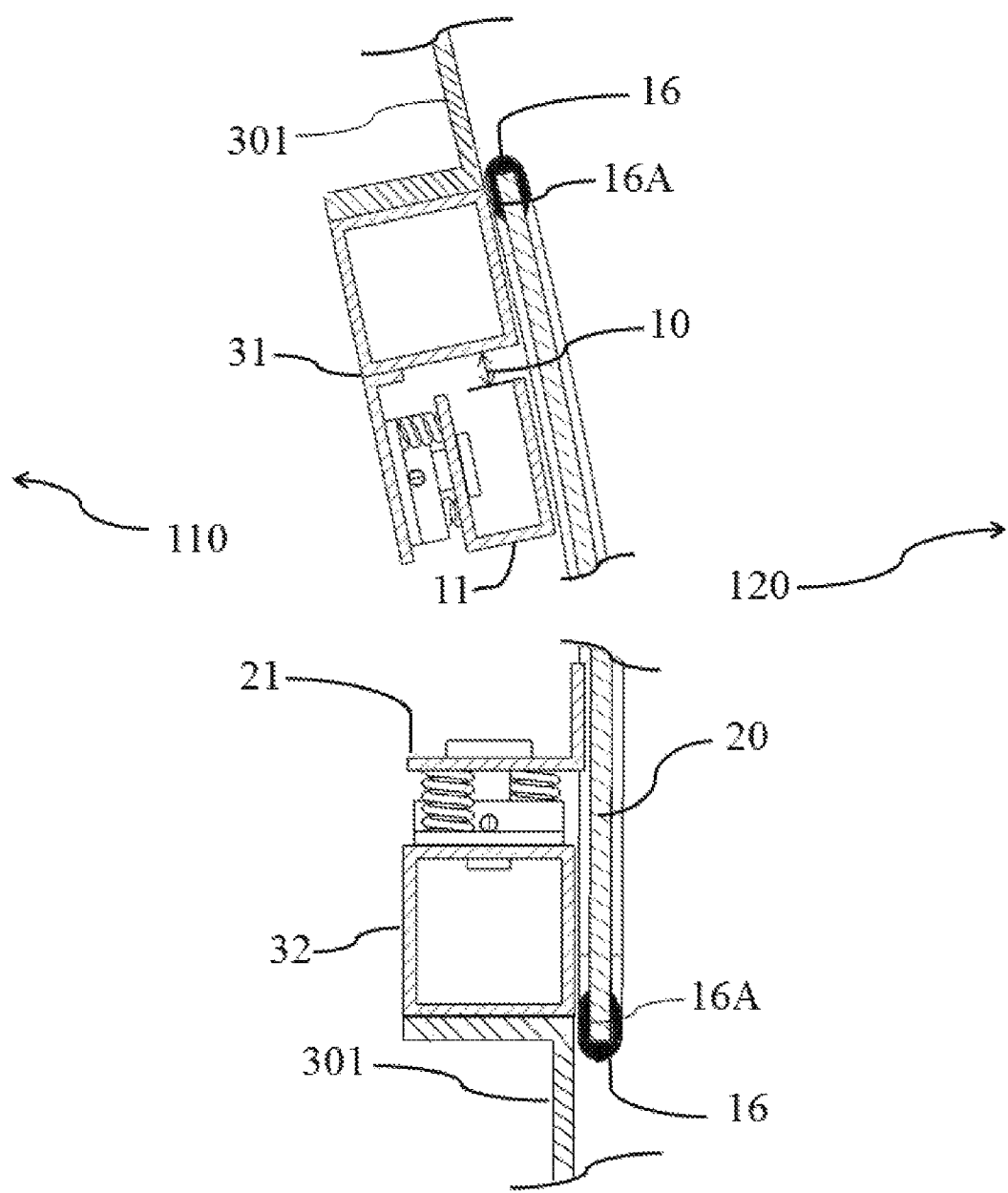
Figure 2A:
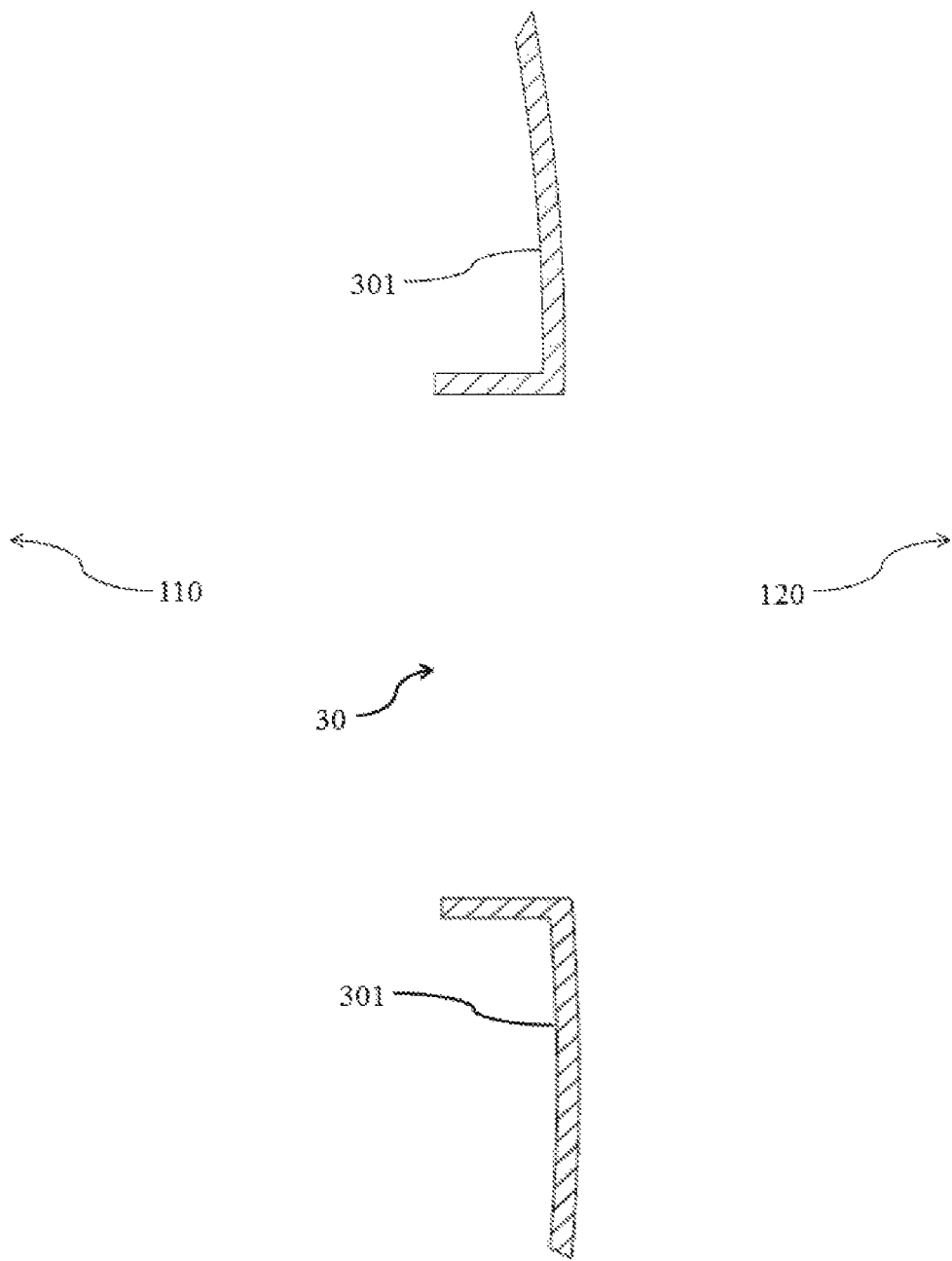
FIG. 2A shows the wall and an aperture therein.
Figure 2B:
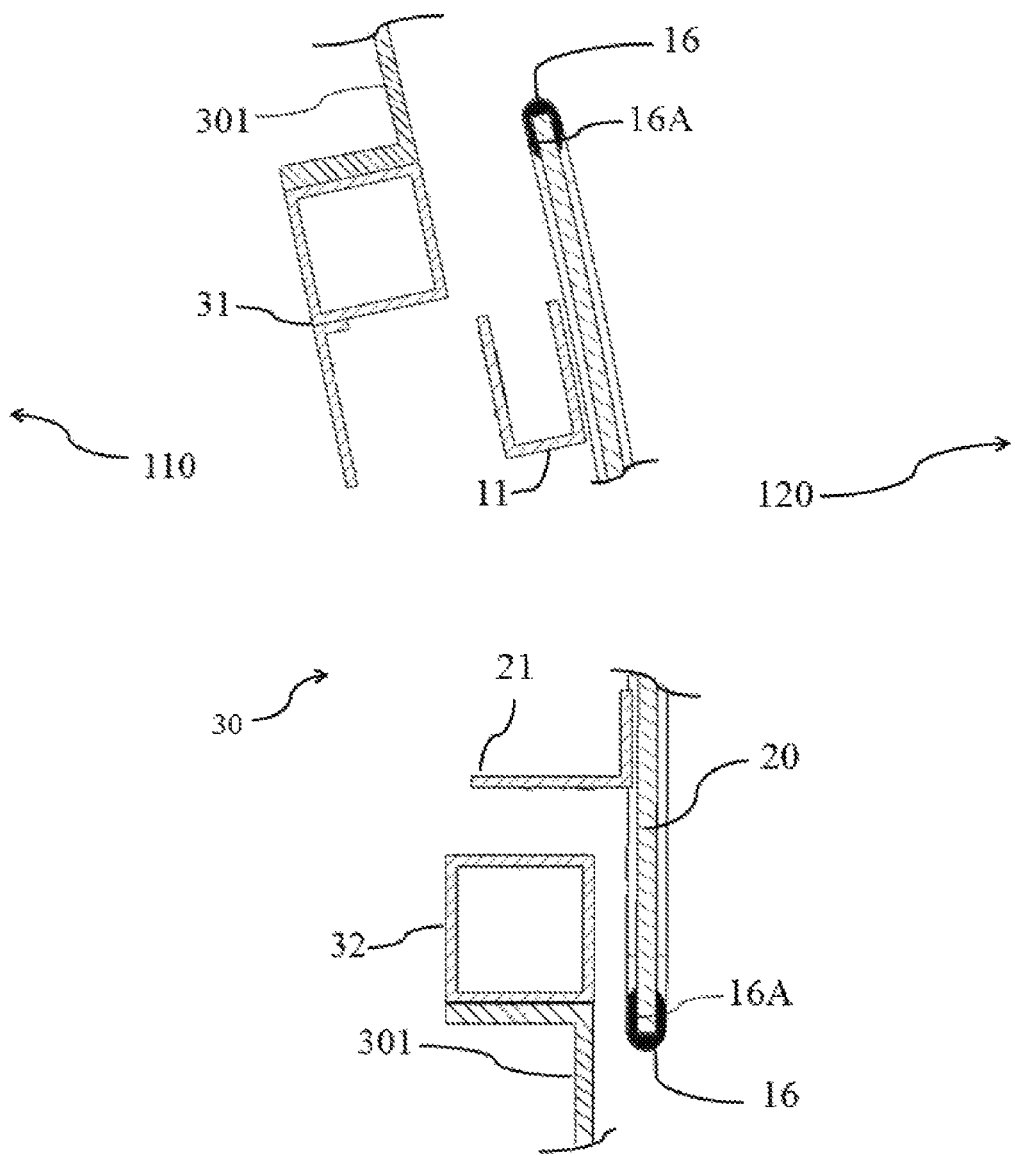
FIG. 2B shows a sideward exploded view of the wall and the aperture cover.

The present invention is an emergency exit arrangement, the overview being as shown in FIG. 1. As shown in FIGS. 2, 2A and 2B, the emergency exit arrangement is for a vehicle or a building having a wall (301) which has an aperture (30), encloses a region termed as an inside (110) and a remaining region other than the inside forms an outside (120). An aperture cover (20) in the preferred embodiment is mounted from the outside (120) of the vehicle or the building to cover the aperture (30) in the vehicle or the building. The aperture cover (20) is made of a transparent material like glass, polycarbonate or such other engineering materials. The aperture cover (20) can also be made of a non-transparent material like steel, aluminium or such other engineering materials. The aperture cover (20) has at least an upper side bracket (11) and a lower side bracket (21) fixed on the aperture cover (20) as described below. Correspondingly, the aperture (30) in the vehicle or a building, which is nothing but an open passage, has a top base (31) and a bottom base (32) attached to the wall (301) of the vehicle or the building. When the aperture cover (20) is mounted so as to cover the aperture (30), the top base (31) of the aperture (30) is above the upper side (11) of the aperture cover (20) and the bottom base (32) of the aperture (30) is below the lower side (21) of the aperture cover (20), with a definite space (10) of few centimeters, which is dimensionally more than a compression length of a plurality of compression springs discussed below, in between the top base (31) and the upper side bracket (11). The compression length of the plurality of compression springs, as is generally known and understood, is a length by which the compression spring can be reversibly compressed by applying a reasonable force.

Figure 3:
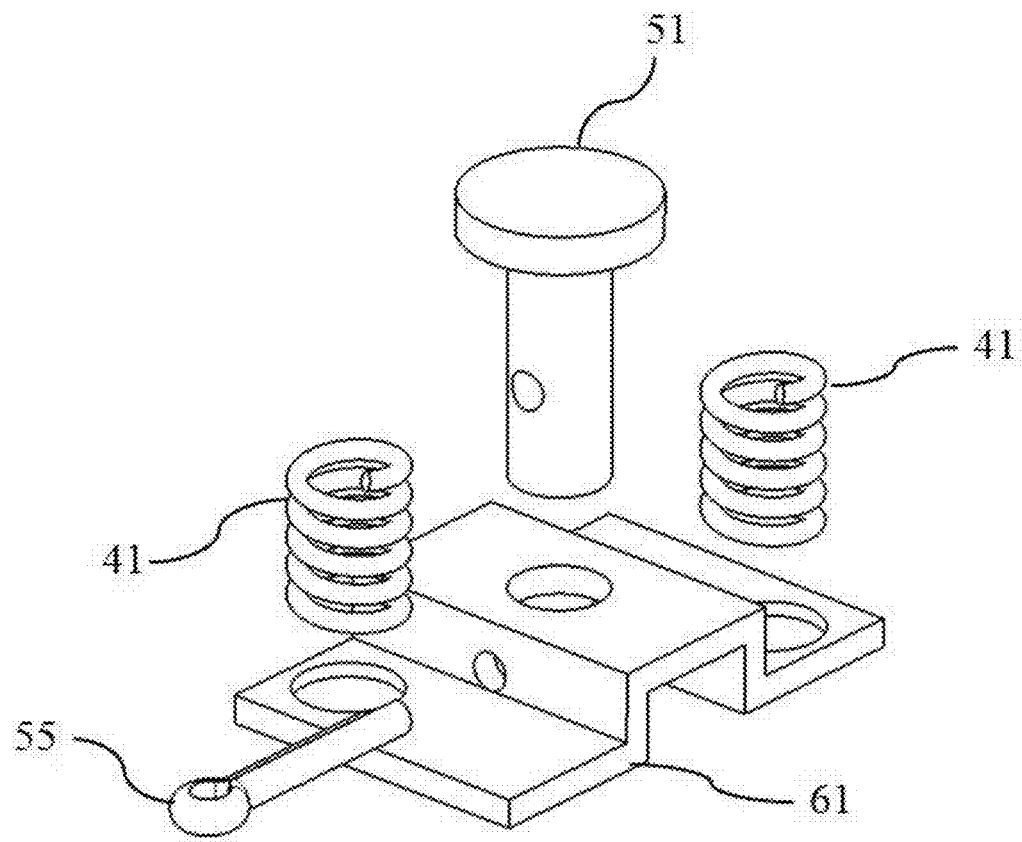
FIG. 3 gives an exploded view of the spring pressured stud assembly.
Figure 9:
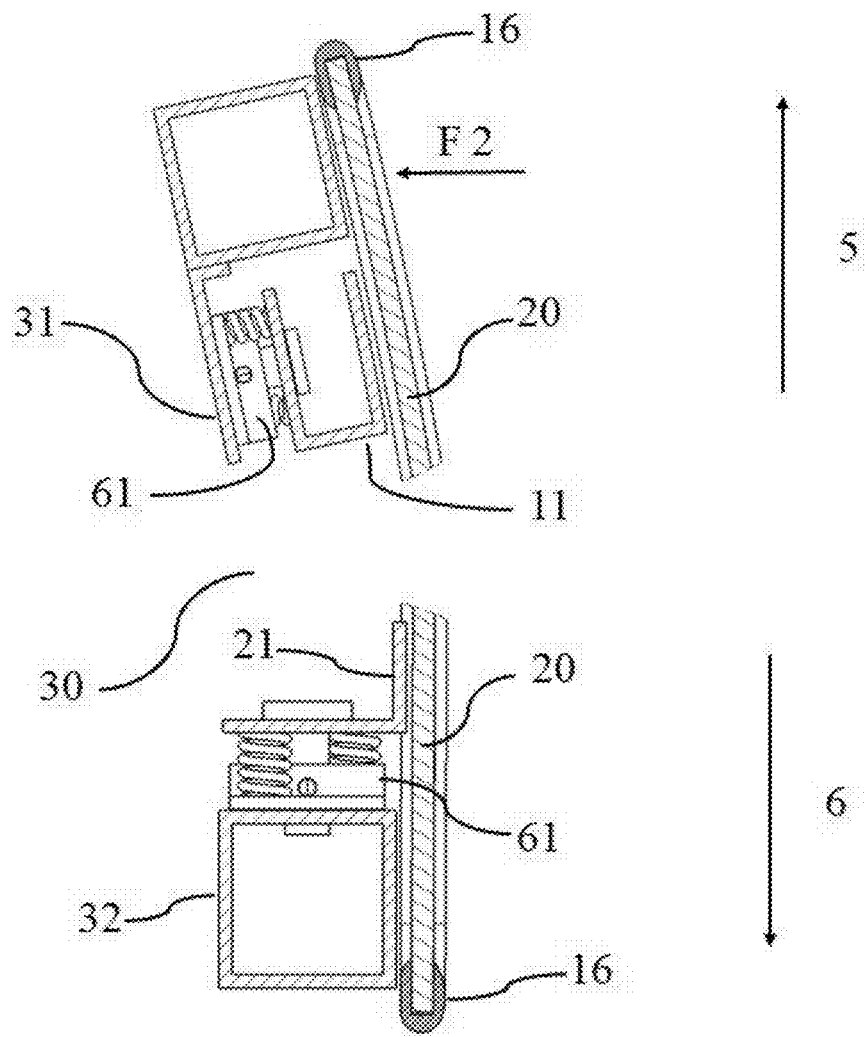
FIG. 9 gives a side view of an upper region and a lower region of the emergency exit arrangement.

As shown in FIG. 3 and FIG. 9, a plurality of spring pressured stud assemblies are provided between the top base (31) of the aperture (30) and the upper side (11) of the aperture cover (20); and between the lower side (21) of the aperture cover (20) and the bottom base (32) of the aperture (30). The spring pressured stud assemblies comprise of a plurality of compression spring (41), at least one stud (51), at least one locking pin (55) and a seat (61). The seats (61) are attached on the top base (31) of the aperture (30) towards the upper side (11) of the aperture cover (20); and on the bottom base (32) of the aperture (30) towards the lower side (21) of the aperture cover (20).

Figure 4:
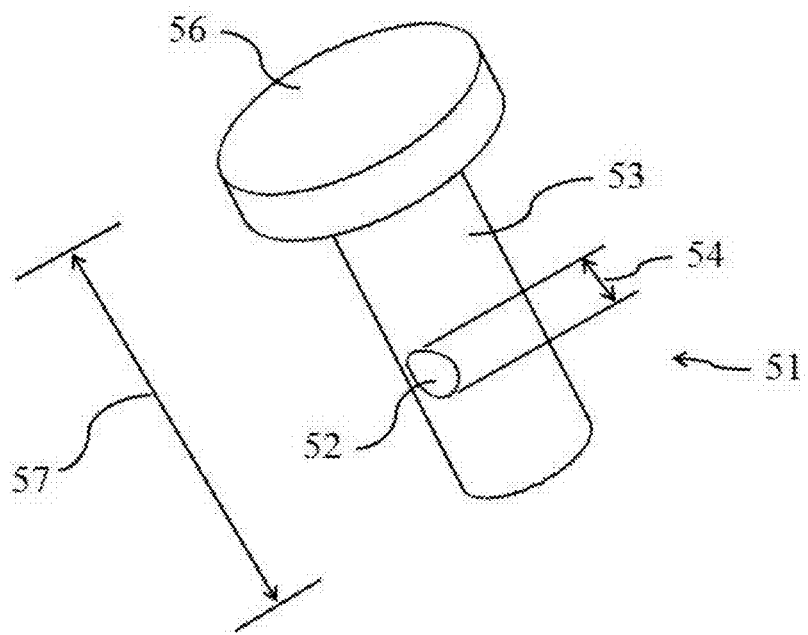
FIG. 4 gives constructional details of a stud.

As shown in FIG. 4, the stud (51) has a stopper head (56) and a stem (53). There is provided a through hole (52) towards a lower end of the stem (53) of the stud (51). A diameter (54) of the through hole (52) is just sufficient to permit entry of the locking pin (55).

Figure 5:
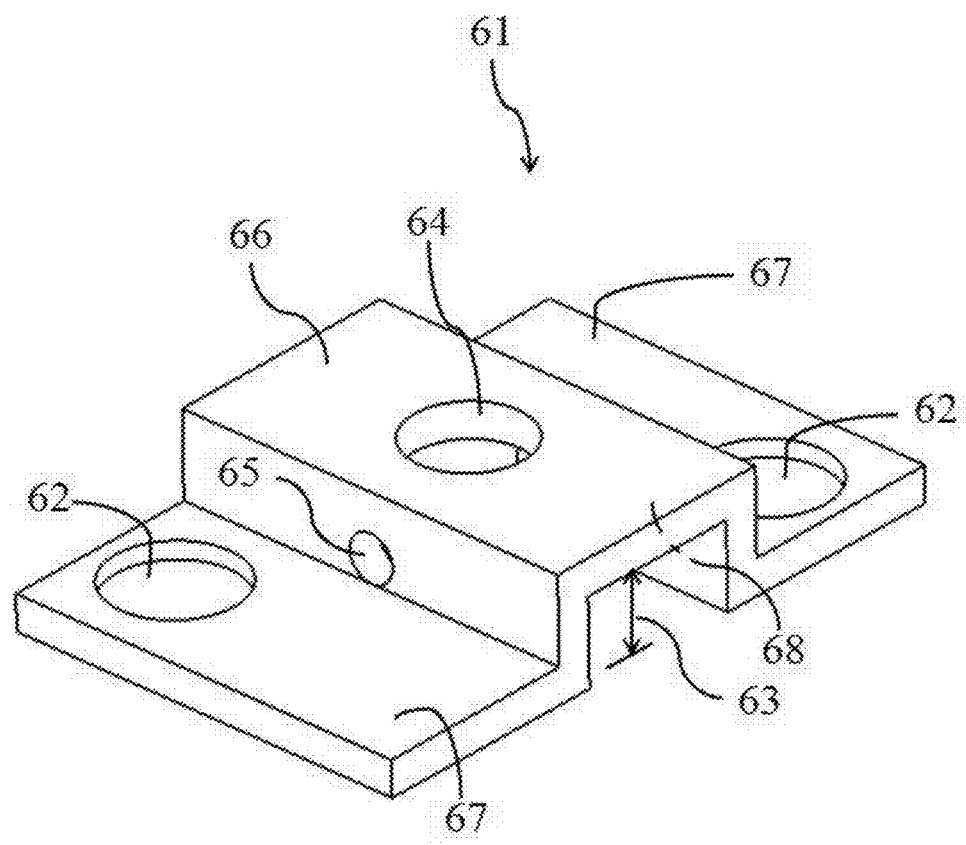
FIG. 5 gives constructional details of a seat.

As shown in FIG. 3 and FIG. 5, the seat (61) has a stepped construction with a first step (66) and a plurality of second step (67). The seat (61) has a central recess (64) on the first step (66) to pass the stem (53) of the stud (51) through the central recess (64). The seat (61) has at least one side recess (65) to facilitate insertion and removal of the locking pin (55). The seat (61) also has a plurality of anchor locations (62) on the plurality of second step (67) for locating the plurality of compression springs (41). The anchor location (62) can be at a raised level with respect to the second step (67). The anchor location (62) can also be at a lowered level, depending on a thickness of a material used to make the seat (61).

Figure 6:
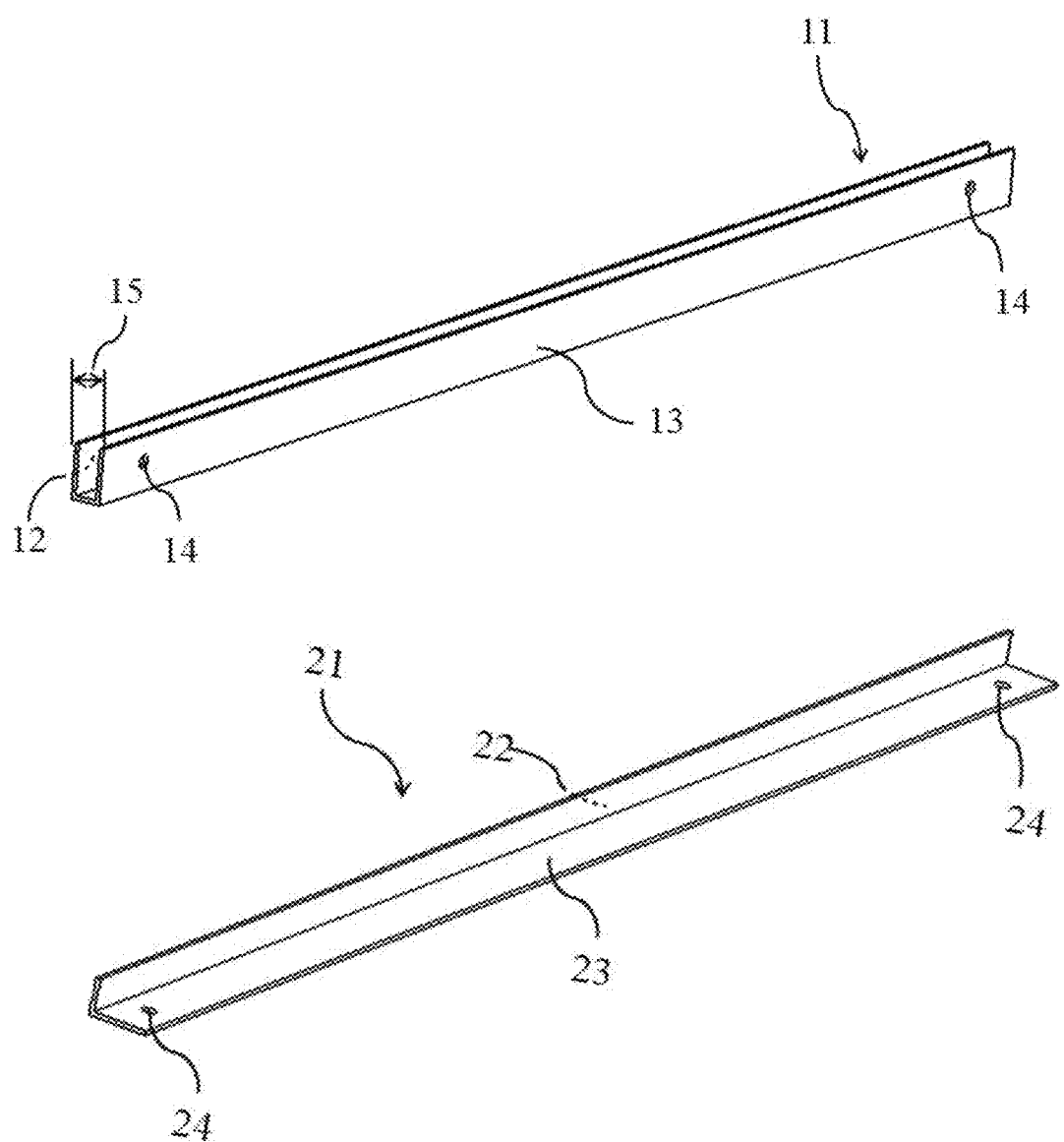
FIG. 6 gives constructional details of an upper side bracket and a lower side bracket.

As shown in FIG. 6, the upper side (11) has a fixing face (12) and an engagement face (13). The fixing face (12) of the upper side (11) is reliably fixed with the aperture cover (20). The engagement face (13) of the upper side (11) has a plurality of opening (14) to insert the stud (51). A distance (15) between the fixing face (12) of the upper side (11) and the engagement face (13) of the upper side (11) is more than an overall length (57) of the stud (51), adequate to facilitate insertion of the stud (51) in the opening (14). The lower side (21) has a fixing face (22) and an engagement face (23). The fixing face (22) of the lower side (21) is reliably fixed with the aperture cover (20). The engagement face (23) of the lower side (21) has a plurality of opening (24) to insert the stud (51). The upper side (11) and the lower side (21) are made of engineering materials like steel, aluminium or glass filled engineering plastics and the fixation of the upper side (11) and the lower side (21) on the aperture cover (20) is in accordance with known methods.

The top base (31) and the bottom base (32), as shown in FIG. 2, are either an open angle or a closed channel or a combination, with enough rigidity to take the load of the aperture cover (20) and the plurality of compression springs (41), besides withstanding working conditions in a vehicle and or a building.

Figure 7:
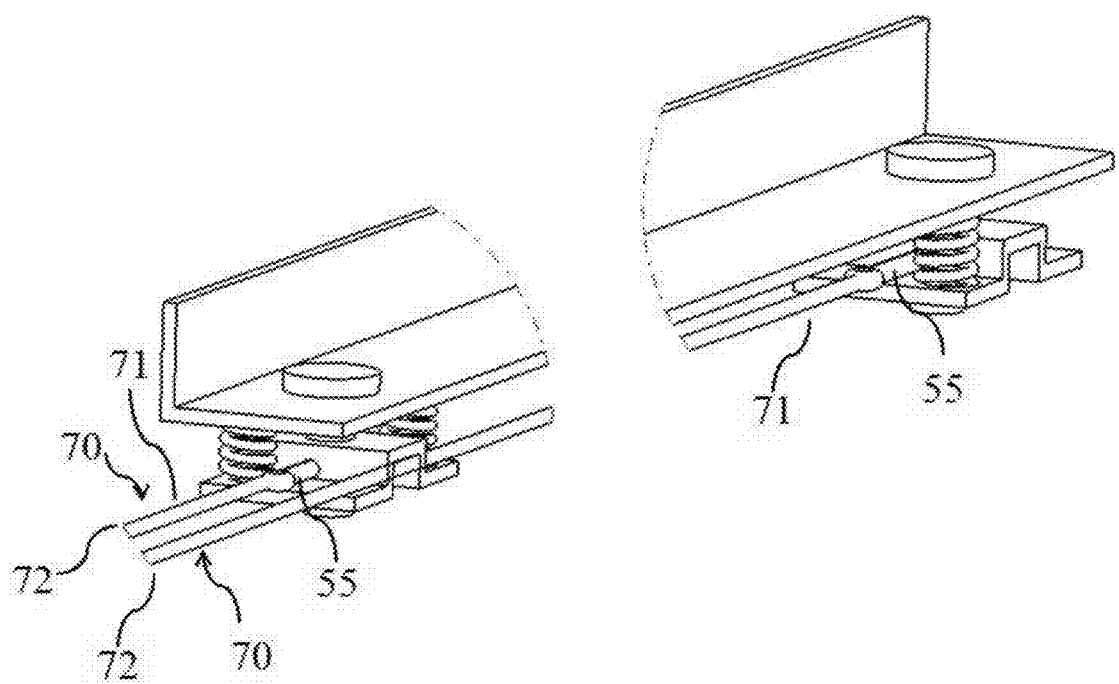
FIG. 7 gives arrangement of locking pins in the lower region connected to respective ropes.
Figure 8:
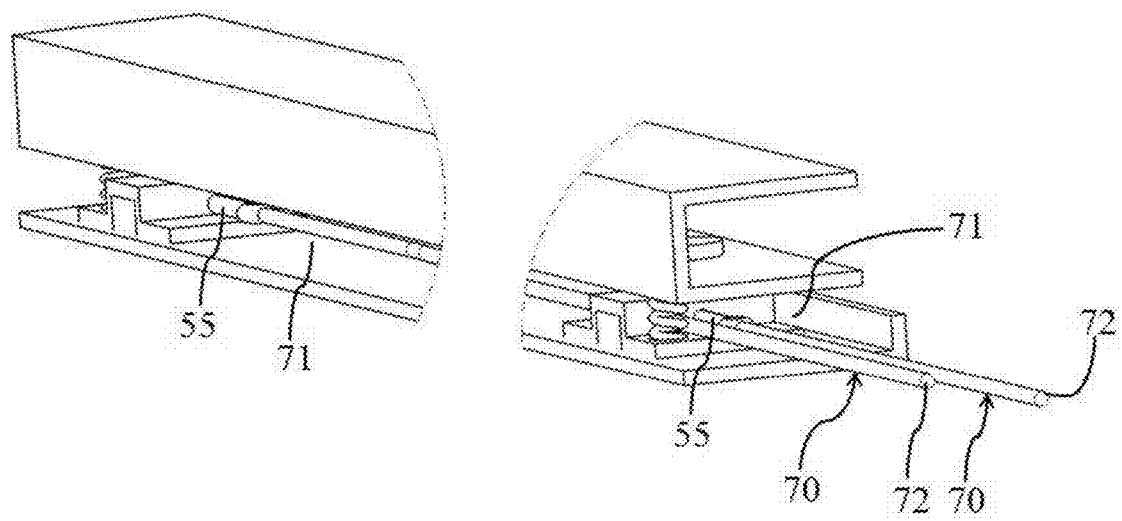
FIG. 8 gives arrangement of locking pins in the upper region connected to respective ropes.

As shown in FIGS. 1, 7 and 8, there are provided a plurality of rope (70). The rope (70) is a flexible link made of a plurality of strand of a metal wire. The rope (70) alternatively is made of suitable flexible engineering plastics, whether of a single rod or multiple runs of thin rods, twisted or entangled together in known ways. Each locking pin (55) of the plurality of spring pressured stud assemblies is connected to a proximal end (71) of the rope (70). A distal end (72) of each rope (70), which is connected to the locking pin (55) at its proximal end (71), provided in the spring pressured stud assembly provided between the top base (31) and the upper side (11), in the upper region (5), is connected to a first pulling device (81). A distal end (72) of each rope (70), which is connected to the locking pin (55) at its proximal end (71), provided in the spring pressured stud assembly provided between the bottom base (32) and the lower side (21), in the lower region (6) is connected to a second pulling device (86).

The aperture cover (20) has a compressible gasket (16) all along the periphery of the aperture cover (20) as shown in FIG. 2 and FIG. 9.

Figure 11:
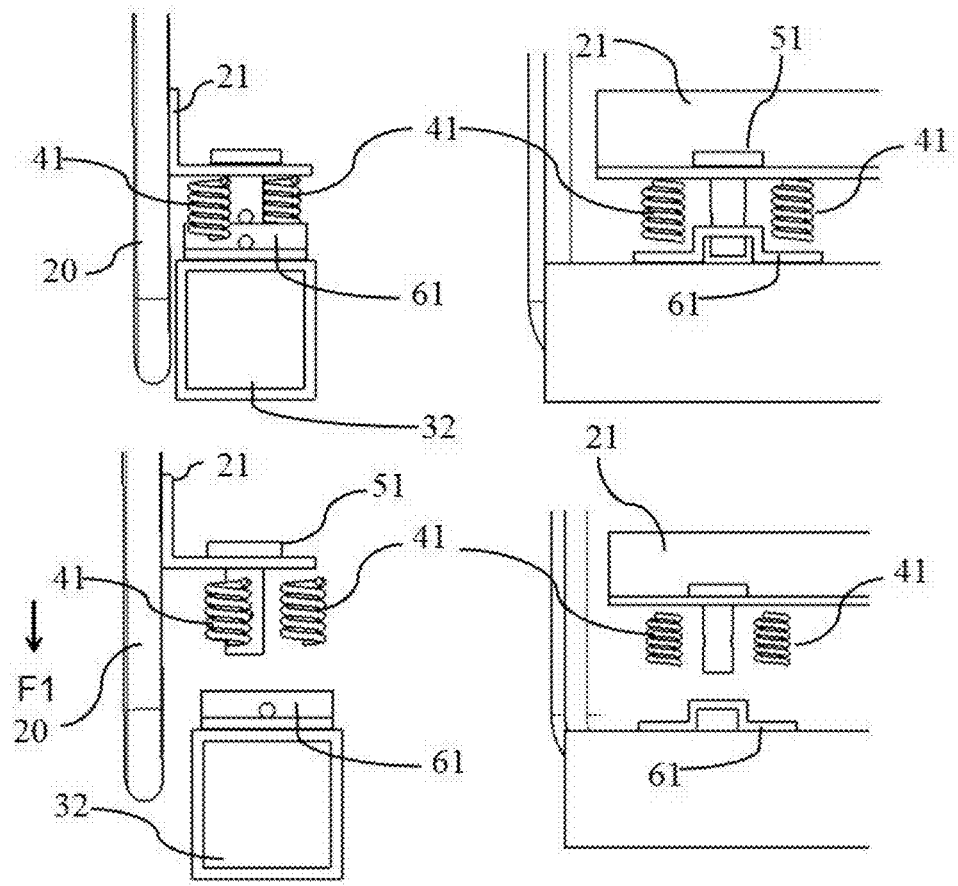
FIG. 11 shows the side view and the inner front view of the lower region of the emergency exit arrangement in different states.

To mount the aperture cover (20) so as to close the aperture (30), the aperture cover (20) is held touching to the top base (31) and the bottom base (32), at a raised level than the mounted level, slightly less than the space (10), such that the compressible gasket (16) is deformed as (16A) so as to effectively seal the gap as shown in FIG. 2 and FIG. 9. At the same time, as shown in FIG. 11, the plurality of compression spring (41) is trapped between the lower side (21) of the aperture cover (20) and the bottom base (32) of the aperture (30) after locating the plurality of compression spring (41) at the plurality of anchor location (62) on the seat (61) as shown in FIG. 11. A downward force F1 is applied and the aperture cover (20) is pressed down so as to overcome the upward force of the plurality of compression spring (41), and at the same time the stud (51) is inserted through the opening (24) in the lower side (21) into the recess (64) of the seat (61) such that the through hole (52) provided on the stud (51) is accessible from below the seat (61) through the side recess (65). The locking pin (55) inserted into the through hole (52) on the stud (51). The downward force F1 is then removed from the aperture cover (20). The plurality of compression spring (41) applies upward reactional force and holds the locking pin (55) rigidly against the mating surface (68) of the seat (61).

Figure 10:
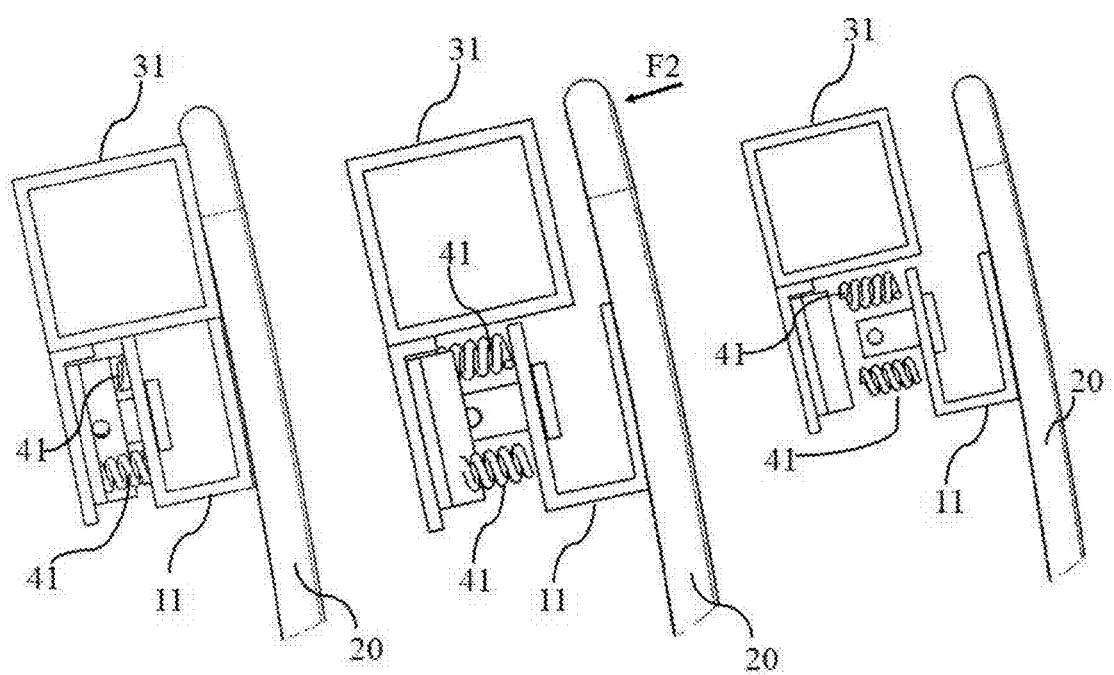
FIG. 10 shows the side views of the upper region of the emergency exit arrangement in different states.

Next, as shown in FIG. 10, the plurality of compression spring (41) is trapped between the top base (31) of the aperture (30) and the upper side bracket (11) of the aperture cover (20) after locating the plurality of compression spring (41) at the plurality of anchor location (62) of the seat (61), and an inward force F2 is applied on the aperture cover (20) so that the aperture cover (20) is pressed from outside to inside so as to overcome the outward force of the plurality of compression spring (41), such that the plurality of compression springs is compressed by the compression length and the through hole (52) provided on the stud (51) is accessible from below the seat (61) through the side recess (65). The locking pin (55) is inserted into through the hole (52) on the stud (51). The inward force F2 is then removed from the aperture cover (20). The plurality of compression spring (41) applies outward reactional force and holds the locking pin (55) rigidly against the mating surface (68) of the seat (61).

As shown in FIGS. 1, 7, and 8, the plurality of locking pin (55) is connected correspondingly to a plurality of rope (70) at a proximal end (71) of the plurality of the rope (70). The distal end (72) of the plurality of rope (70) in the upper region (5) are connected to a first pulling device (81) while the distal end (72) of the plurality of rope (70) in the lower region (6) are connected to a second pulling device (86).

A step by step mounting of the aperture cover (20) on the aperture (30), thus comprises the steps of:
 a. trapping the plurality of compression spring (41) between the lower side (21) of the aperture cover (20) and the bottom base (32) of the aperture (30);
 b. holding the aperture cover (20) against the top base (31) and the bottom base (32) of the aperture with a force, at a raised level than the mounted level, slightly less than the space (10) such that the compressible gasket (16) is deformed as (16A);
c. applying a downward force F1 on the aperture cover (20);
d. inserting the stud (51) in an opening (24) in the lower side (21) of the aperture cover (20) into a recess (64) of the seat (61) such that the through hole (52) provided on the stud (51) is accessible from below the seat (61) through a side recess (65);
e. inserting the locking pin (55) into the through hole (52) on the stud (51);
f. removing the downward force F1 from the aperture cover (20);
g. trapping the plurality of compression spring (41) between the top base (31) of the aperture (30) and the upper side (11) of the aperture cover (20);
h. applying an inward force F2 on the aperture cover (20);
i. inserting the locking pin (55) into the through hole (52) on the stud (51);
j. removing the inward force F2 from the aperture cover (20);
k. connecting the plurality of locking pin (55) to a plurality of rope (70) at a proximal end (71) of the plurality of the rope (70);
l. connecting the distal end (72) of the plurality of rope (70) in the upper region (5) to a first pulling device (81);
m. connecting the distal end (72) of the plurality of rope (70) in the lower region (6) to a second pulling device (86).

As shown in FIGS. 1, 3, 8 and 10, to release the aperture cover (20) in situations of distress, the first pulling device (81) pulls the plurality of rope (70) from their distal end (72). The pulling action causes pulling out of all the locking pins (55) in the upper region (5). The outward reactional force pushes away the fixing face (12) of the upper side (11) and consequently the aperture cover (20) is pushed outwards. In this manner, the aperture cover (20) becomes free from the upper region (5).

Next, as shown in FIGS. 1, 3 7 and 11, the second pulling device (86) pulls the plurality of rope (70) from the distal region (72) in the lower region (6). The pulling action causes pulling out of all the locking pins (55) in the lower region (6). Consequently, the plurality of compression springs decompress and an upward reactional force of the compression spring (41) pushes up the engagement face (23) of the lower side bracket (21) and consequently the aperture cover (20) is raised upwards as much as the compression length of the plurality of springs. Since, the aperture cover (20) is already free from the upper side bracket (11); the aperture cover (20) ejects up and then gravitationally falls out, leaving the aperture (30) clear for exiting of persons.

Thus a release of the aperture cover (20) comprises the following self-triggering steps consequent to the sequential actuation of the first pulling device (81) and the second pulling device (86), comprising the steps of:
i. Pulling of the plurality of rope (70) from their distal end (72) by the first pulling device (81);
ii. pulling out of all the plurality of locking pin (55) in the upper region due to the pulling of the plurality of rope (70);
iii. pushing away of the fixing face (12) of the upper side (11) of the aperture cover (11) due to an outward reactional force of the plurality of compression spring (41);
iv. pushing outwards of the aperture cover (20) due to pushing away of the fixing face (12) of the upper side (11);
v. freeing of the aperture cover (20) from the upper region (5);
vi. pulling of the plurality of rope (70) from the distal region (72) by the second pulling device (86);
vii. pulling out of all the plurality of locking pin (55) in the lower region (6) due to the pulling of the plurality of rope (70);
viii. pushing up of the engagement face (23) of the lower side (21) of the aperture cover (20) due to an upward reactional force of the plurality of compression spring (41);
ix. pushing upwards of the aperture cover (20);
x. ejected up of the aperture cover (20); and
xi. falling out of the aperture cover (20) gravitationally.

Figure 12:
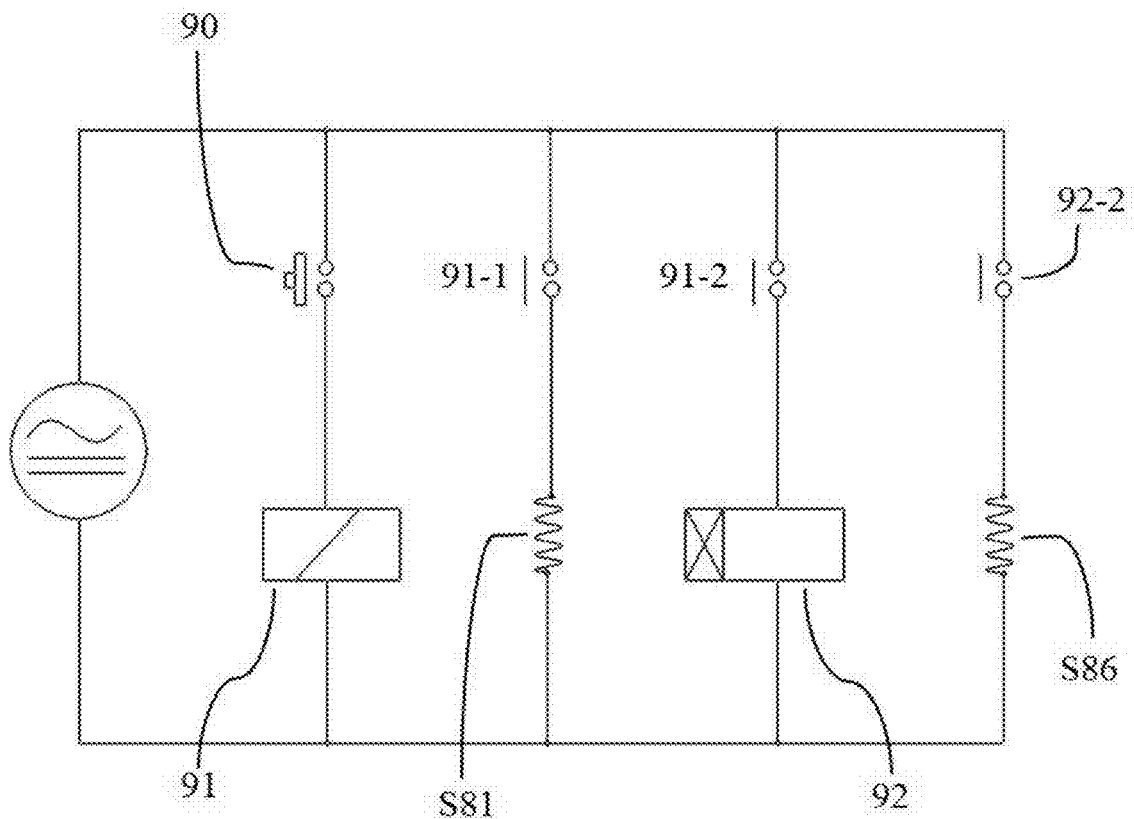
FIG. 12 gives a schematic diagram when deploying solenoid operated plungers as the first pulling device and the second pulling device.

As a preferred embodiment, the first pulling device (81) and the second pulling device (86) are a solenoid operated plungers. As shown in FIGS. 1 and 12, the first pulling device (81) has a first solenoid (S81) and the second pulling device (86) has a second solenoid (S86). On pressing a DISTRESS push button (90), a relay (91) is energized. Consequently, its normally open contact (91-1) changes over to close position. This causes the first solenoid (S81) to get energized, causing its plunger to pull back, which thus pulls the distal end (72) of the plurality of rope (70) in the upper region (5). At the same time, another normally open contact (91-2) of the relay (91) also changes over to close position and causes an ON delay timer (92) to start counting a set time and change over the normally open contact (92-2) of the ON delay time (92) to close position after the set time, which is typically few seconds. Consequently, the second solenoid (S86) gets energized after the set time, causing its plunger to pull back, which thus pulls the distal end (72) of the plurality of rope (70) in the lower region (6); and the aperture cover (20) ejects up, which is made possible consequent to the space (10) even if the aperture cover (20) ejects up fast; and then the aperture cover (20) gravitationally falls out as described above.

Thus a quick and effortless release of the aperture cover (20) comprises the following self-triggering steps consequent to pressing of a DISTRESS push button (90):
(i) energizing of a relay (91) by the pressing of the DISTRESS push button (90);
(ii) changing over of a normally open contact (91-1) of the relay (91) to a close position.
(iii) changing over of another normally open contact (91-2) of the relay (91) to a close position.
(iv) counting of a set time by an ON delay timer (92);
(v) energizing of the first solenoid (S81);
(vi) pulling back of a plunger of the first solenoid operated plunger;
(vii) pulling of the distal end (72) of the plurality of rope (70) in the upper region (5) by the plunger of the first solenoid operated plunger;
(viii) pulling out of all the plurality of locking pin (55) in the upper region (5) due to the pulling of the plurality of rope (70);
(ix) pushing away of the fixing face (12) of the upper side (11) of the aperture cover (20) due to an outward reactional force of the plurality of compression spring (41);
(x) pushing outwards of the aperture cover (20) due to pushing away of the fixing face (12) of the upper side (11);

(xi) freeing of the aperture cover (20) from the upper region (5);
(xii) changing over of a normally open contact (92-2) of the ON delay time (92) to a close position after the set time;
(xiii) energizing of the second solenoid (S86) after the set time;
(xiv) pulling back of a plunger of the second solenoid operated plunger;
(xv) pulling of the distal end (72) of the plurality of rope (70) in the lower region (6) by the plunger of the second solenoid operated plunger;
(xvi) pulling out of all the plurality of locking pin (55) in the lower region (6) due to the pulling of the plurality of rope (70);
(xvii) pushing up of the engagement face (23) of the lower side (21) of the aperture cover (20) due to an upward reactional force of the plurality of compression spring (41);
(xviii) pushing upwards of the aperture cover (20);
(xix) ejecting up of the aperture cover (20); and
(xx) falling out of the aperture cover (20) gravitationally.

In place of the DISTRESS push button (90), temperature sensor, smoke sensor, pressure sensor, impact sensor and or a combination of such sensors can be provided whose output energizes the relay (91).

Figure 13:
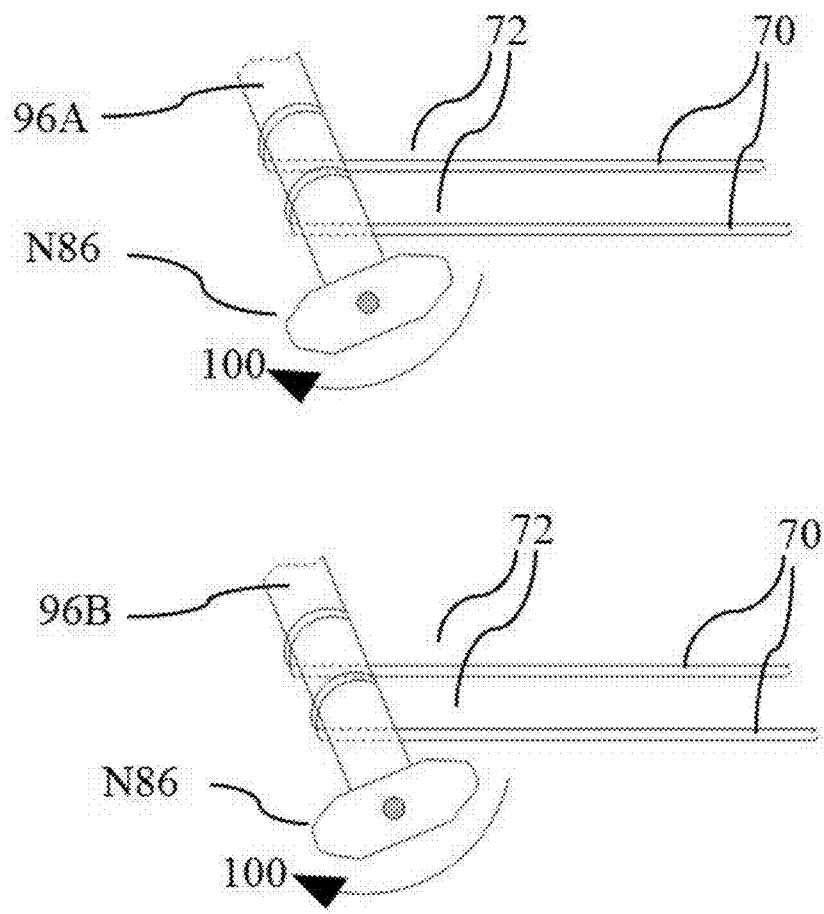
FIG. 13 shows an arrangement when the pulling devices, namely the first pulling device and the second pulling device are rotatable knobs.

As another embodiment, the first pulling device (81) and the second pulling device (86) are a first rotatable Knob (N81) and a second rotatable knob (N86), having a first and a second cylindrical shaft (96A and 96B), as shown in FIG. 13. On turning the knobs clockwise (100), the distal end (72) of the plurality of rope (70) is made to wind on the respective cylindrical shaft (96), causing the plurality of locking pin (55) to get pulled from the hole (52) of the stem (53) of the stud (51). By first turning the first rotatable knob (N81) and then turning the second rotatable knob (N86), the aperture cover (20) ejects up and then gravitationally falls out.

Thus this semi-automatic embodiment of a release of the aperture cover (20) comprises the sequential self-triggered steps, consequent to clockwise turning clockwise of the first rotatable knob, of:
a. winding of the distal end (72) of the plurality of rope (70) in the upper region (5) by the first cylindrical shaft (96A) due to clockwise turning of the first rotatable knob (N81);
b. pulling of the plurality of rope (70) from their distal end (70) by the winding of the distal end (70) the plurality of rope (70);
c. pulling out of all the plurality of locking pin (55) in the upper region (5) due to the pulling of the plurality of rope (70);
d. pushing away of the fixing face (12) of the upper side (11) of the aperture cover (20) due to an outward reactional force of the plurality of compression spring (41);
e. pushing outwards of the aperture cover (20) due to pushing away of the fixing face (12) of the upper side (11); and
f. freeing of the aperture cover (20) from the upper region (5);
further, consequent to clockwise turning clockwise of the second rotatable knob:
g. winding of the distal end (72) of the plurality of rope (70) in the lower region (6) by the second cylindrical shaft (96B) due to clockwise turning of the second rotatable knob (N86)
h. pulling of the plurality of rope (70) from their distal end (72) by the winding of the distal end (72) the plurality of rope (70);
i. pulling out of all the plurality of locking pin (55) in the lower region (6) due to the pulling of the plurality of rope (70);
j. pushing up of the engagement face (23) of the lower side (21) of the aperture cover (20) due to an upward reactional force of the plurality of compression spring (41);
k. pushing upwards of the aperture cover (20);
l. ejecting up of the aperture cover (20); and
m. falling out of the aperture cover (20) gravitationally.

Figure 14:
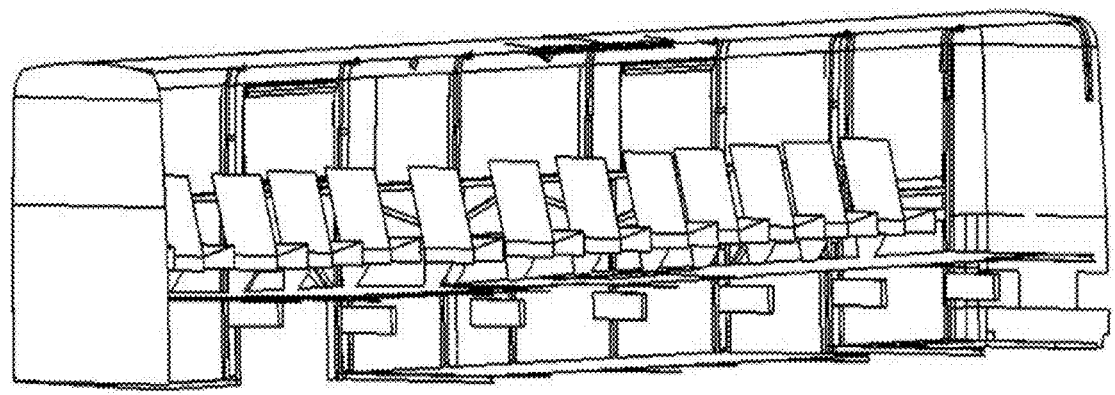
FIG. 14 is an illustration of the emergency exit arrangement provided in a transport vehicle, and which is similar for a building.

FIG. 14 shows the emergency exit arrangement provided in a transport vehicle.

The arrangement described above is considering the aperture cover ejecting and falling outside a vehicle or a building, however the arrangement can also be deployed where the aperture cover is require to eject and fall inside the vehicle or the building, for want of required room or convenience.

The pulling devices can be actuated or operated from inside the vehicle or the building or outside the vehicle or building as demanded by application.

The first pulling device and the second pulling device can be combined into an integral pulling device with provision for delayed pull for the plurality of rope on the lower region.

The invention claimed is:
1. An emergency exit arrangement for a vehicle or a building having a wall and an aperture therein, comprising of:
   a. an aperture cover having a periphery, at least an upper side bracket and a lower side bracket;
   b. a top base and a bottom base attached to the wall of the vehicle or the building;
   c. a plurality of spring pressured stud assemblies, each comprising of:
      i. a plurality of compression springs;
      ii. at least one stud having a stopper head and a stem;
      iii. at least a locking pin; and
      iv. a seat;
   d. a plurality of ropes each having a proximal end and a distal end;
   a compressible gasket disposed on said periphery of the aperture cover, the aperture cover when mounted so as to cover the aperture, has the upper side bracket of the aperture cover below the top base of the wall and has the bottom base of the wall below the lower side bracket of the aperture cover, with a definite space which is dimensionally more than a compression length of the plurality of compression springs in between the top base of the wall and the upper side bracket of the aperture cover;
   the plurality of spring pressured stud assemblies are provided between the top base of the wall and the upper side bracket of the aperture cover, and between the lower side bracket of the aperture cover and the bottom base of the wall;
   each locking pin is connected to the proximal end of one of the ropes;
   the distal end of one of the ropes, which is connected to the locking pin of the plurality of spring pressured stud assemblies which is provided between the top base of the wall and the upper side bracket of the aperture cover, is connected to a first pulling device, and the distal end of another rope, which is connected to the locking pin, of the plurality of spring pressured stud assemblies which is provided between the bottom base of the wall and the lower side bracket of the aperture cover, is connected to a second pulling device.

2. The emergency exit arrangement as claimed in claim 1, wherein the plurality of seats are attached on the top base of the aperture towards the upper side bracket of the aperture cover and on the bottom base of the aperture towards the lower side bracket of the aperture cover.

3. The emergency exit arrangement as claimed in claim 1, wherein the at least one stud has a through hole towards the lower end of the stem, disposed to receive the at least one locking pin therethrough.

4. The emergency exit arrangement as claimed in claim 1, wherein the seat has a stepped construction with a first step and a plurality of second steps.

5. The emergency exit arrangement as claimed in claim 4, wherein the seat has a plurality of anchor locations on the plurality of second steps.

6. The emergency exit arrangement as claimed in claim 5, wherein the plurality of anchor locations are at a raised level with respect to the plurality of second steps.

7. The emergency exit arrangement as claimed in claim 5 wherein, the plurality of anchor locations are at a lowered level with respect to the plurality of second steps.

8. The emergency exit arrangement as claimed in claim 4, wherein the seat has a central recess on the first step to pass the stem of the at least one stud through the central recess.

9. The emergency exit arrangement as claimed in claim 1, wherein the seat has at least one side recess to facilitate an insertion of the at least one locking pins and a removal of the at least one locking pin.

10. The emergency exit arrangement as claimed in claim 1, wherein the upper side bracket of the aperture cover has a fixing face and an engagement face; a distance between the fixing face and the engagement face, more than a length of the at least one stud, to facilitate insertion of the at least one stud in the opening.

11. The emergency exit arrangement as claimed in claim 10, wherein the upper side bracket of the aperture cover has the fixing face reliably fixed with the aperture cover.

12. The emergency exit arrangement as claimed in claim 10, wherein the upper side bracket of the aperture cover has the engagement face having a plurality of openings.

13. The emergency exit arrangement as claimed in claim 1, wherein the lower side bracket of the aperture cover has a fixing face and an engagement face.

14. The emergency exit arrangement as claimed in claim 13, wherein the lower side bracket of the aperture cover has the fixing face reliably fixed with the aperture cover.

15. The emergency exit arrangement as claimed in claim 13, wherein the lower side bracket of the aperture cover has the engagement face having a plurality of openings.

16. The emergency exit arrangement as claimed in claim 1, wherein the first pulling device is a solenoid operated plunger with a first solenoid and the second pulling device is a solenoid operated plunger with a second solenoid.

17. The emergency exit arrangement as claimed in claim 1, wherein the first pulling device is a first rotatable knob having a first cylindrical shaft and the second pulling device is a second rotatable knob having a second cylindrical shaft.

18. The emergency exit arrangement as claimed in claim 1, wherein the first pulling device and the second pulling device is actuated from an inside of the vehicle or the building if the aperture cover is previously mounted from the outside of the vehicle or the building to cover the aperture in the vehicle or the building.

19. The emergency exit arrangement as claimed in claim 1, wherein the first pulling device and the second pulling device are combined into an integral pulling device with a provision for a delayed pull for the plurality of ropes in the lower region of the emergency exit arrangement.

20. The emergency exit arrangement as claimed in claim 1, wherein the first pulling device and the second pulling device is actuated from an outside of the vehicle or the building if the aperture cover is previously mounted from the inside of the vehicle or the building to cover the aperture in the vehicle or the building.

21. A mount arrangement for an aperture cover to close an aperture of an emergency exit arrangement for a vehicle or a building having a wall and an aperture therein, comprising of:
   a. an aperture cover having a periphery, at least an upper side bracket and a lower side bracket;
   b. a top base and a bottom base attached to the wall of the vehicle or the building;
   c. a plurality of spring pressured stud assemblies, each comprising of:
      i. a plurality of compression springs;
      ii. at least one stud having a stopper head and a stem;
      iii. at least a locking pin; and
      iv. a seat;
   d. a plurality of ropes each having a proximal end and a distal end;
   the plurality of compression springs are trapped between a lower side bracket of the aperture cover and a bottom base of the wall;
   the aperture cover being held against the top base and the bottom base of the wall with a force, at a raised level which is dimensionally more than a compression length of the plurality of compression springs than a mounted level, such that a compressible gasket along a periphery of the aperture cover is deformed with the force;
   at least one stud of the plurality of spring pressured stud assemblies, being inserted with a downward force F1 on the aperture cover in an opening in the lower side bracket of the aperture cover into a recess of a corresponding seat, to make a through hole provided on the at least one stud, accessible from below the corresponding seat through a side recess;
   at least one locking pin of the plurality of spring pressured stud assemblies, being inserted through a through hole provided on the at least one stud on the lower side bracket of the aperture cover, and removal of the downward force F1 thereafter;
   each of the plurality of compression springs are being trapped between the upper side bracket of the aperture cover and the top base of the wall;
   at least one stud of the plurality of spring pressured stud assemblies, being inserted with an inward force F2 on the aperture cover in an opening in the upper side bracket of the aperture cover into a recess of a corresponding seat, to make a through hole provided on the at least one stud, accessible from below the corresponding seat through a side recess;
   at least one locking pin of the plurality of spring pressured stud assemblies, being inserted through the through hole on the at least one stud on the upper side bracket of the aperture cover and removal of the inward force F2;
   each of the proximal ends of a plurality of ropes being connected to the at least one locking pin; and each of the distal ends of the plurality of ropes being connected to a first pulling device on an upper region of the emergency exit arrangement and a second pulling device on a lower region of the emergency exit arrangement, thus aperture cover being mounted onto the aperture.

22. The mount arrangement as claimed in claim 21, wherein the plurality of compression spring applies a reactional force and holds the locking pin rigidly against a mating surface of the seat.

23. A release arrangement for aperture cover of an emergency exit arrangement for a vehicle or a building having a wall and an aperture therein, comprising of:
  a. an aperture cover having a periphery, at least an upper side bracket and a lower side bracket;
  b. a top base and a bottom base attached to the wall of the vehicle or the building;
  c. a plurality of spring pressured stud assemblies, each comprising of:
    i. a plurality of compression springs;
    ii. at least one stud having a stopper head and a stem;
    iii. at least a locking pin; and
    iv. a seat;
  d. a plurality of ropes each having a proximal end and a distal end;
  each locking pin of a plurality of spring pressured stud assemblies at an upper region of the emergency exit arrangement and a lower region of the emergency exit arrangement, being connected to proximal ends of corresponding ropes;
  a first pulling device at the upper region of the emergency exit arrangement being connected to the distal end of one of the ropes;
  a second pulling device at the lower region of the emergency exit arrangement being connected to the distal end of another rope;
  a fixing face of an upper side bracket and a lower side bracket being fixed with an aperture cover;
  each stud of the plurality of spring pressured stud assemblies being inserted into an engagement face of the upper side bracket and an engagement face of the lower side bracket, the respective engagement faces having a plurality of openings; and
  wherein the first pulling device on being pulled, pulls out the locking pin from a through hole on the stem of the at least one stud of the plurality of spring pressured stud assemblies allowing the plurality of compression springs to push away the fixing face of the upper side bracket of the aperture cover due to an outward reactional force of the plurality of compression springs in the upper region of the emergency exit arrangement and the second pulling device on pulling releases the locking pin from the through hole on the stem of the at least one stud of the plurality of spring pressured stud assemblies allowing the plurality of compression springs push up the engagement face of the lower side bracket of the aperture cover due to an upward reactional force of the plurality of compression springs in the lower region of the emergency exit arrangement, and thus releases the aperture cover from the wall.

24. A release arrangement for aperture cover of an emergency exit arrangement for a vehicle or a building having a wall and an aperture therein comprising of:
  a. an aperture cover having a periphery, at least an upper side bracket and a lower side bracket;
  b. a top base and a bottom base attached to the wall of the vehicle or the building;
  c. a plurality of spring pressured stud assemblies, each comprising of:
    i. a plurality of compression springs;
    ii. at least one stud having a stopper head and a stem;
    iii. at least a locking pin; and
    iv. a seat;
  d. a plurality of ropes each having a proximal end and a distal end;
  a distress push button being connected to a relay system comprising a relay and an ON delay timer, wherein the relay moves from an open contact to a close position when energized;
  a first pulling device is a first solenoid operated plunger being connected to the relay system and connected to distal ends of a plurality of ropes at an upper region of the emergency exit arrangement;
  a second pulling device is a second solenoid operated plunger being connected to the relay system and connected to the distal ends of the plurality of ropes at a lower region of the emergency exit arrangement;
  each locking pin of a plurality of spring pressured stud assemblies at an upper region of the emergency exit arrangement and a lower region of the emergency exit arrangement, being connected to proximal ends of a plurality of ropes;
  each stud of the plurality of spring pressured stud assemblies being inserted into an engagement face of the upper side bracket and an engagement face of the lower side bracket, respective engagement faces having a plurality of openings; and
  wherein the distress push button when pressed energizes the relay, the relay changes over the open contact to the close position, energizing the first solenoid of the first solenoid operated plunger causing plunger of the first solenoid operated plunger pull the distal ends of the plurality of ropes of the upper region of the emergency exit arrangement, pull out the locking pin from a through hole on the stein of the at least one stud of the plurality of spring pressured stud assemblies allowing the plurality of compression springs to push away the fixing face of the upper side bracket of the aperture cover due to an outward reactional force of the plurality of compression springs freeing the aperture cover from upper region and further the second solenoid of the second solenoid operated plunger being energised after a set time causing the plunger of the second solenoid operated plunger to pull the distal ends of the plurality of ropes of the lower region of the emergency exit arrangement, pull out the locking pin from the through hole on the stem of the at least one stud of the plurality of spring pressured stud assemblies allowing the plurality of compression springs push up the engagement face of the lower side bracket of the aperture cover due to an upward reactional force of the plurality of compression springs, thus the aperture cover being pushed upward and the aperture cover being released from the wall.

25. The release arrangement as claimed in claim 24, wherein the energizing of the relay is by an output selected from the group consisting of a temperature sensor, a smoke sensor, a pressure sensor, an impact sensor and a combination of such sensors.

26. A release arrangement for aperture cover of an emergency exit arrangement for a vehicle or a building having a wall and an aperture therein, comprising of:
  a. an aperture cover having a periphery, at least an upper side bracket and a lower side bracket;

b. a top base and a bottom base attached to the wall of the vehicle or the building;

c. a plurality of spring pressured stud assemblies, each comprising of:
   i. a plurality of compression springs;
   ii. at least one stud having a stopper head and a stem;
   iii. at least a locking pin; and
   iv. a seat;

d. a plurality of ropes each having a proximal end and a distal end;

each locking pin of a plurality of spring pressured stud assemblies at an upper region of the emergency exit arrangement and a lower region of the emergency exit arrangement being connected to proximal ends of corresponding ropes;

a first rotatable knob having a first cylindrical shaft at the upper region of the emergency exit arrangement being connected to distal ends of the plurality of ropes;

a second rotatable knob having a second cylindrical shaft at the lower region of the emergency exit arrangement being connected to distal ends of the plurality of ropes;

each stud of the plurality of spring pressured stud assemblies being inserted into an engagement face of the upper side bracket and an engagement face of the lower side bracket, respective engagement faces having a plurality of openings; and wherein on a clockwise turn of the first rotatable knob, the first cylindrical shaft winds the distal ends of the plurality of ropes to pull the locking pin from a through hole on a stem of the at least one stud of the plurality of spring pressured stud assemblies allowing the plurality of compression springs to push away the fixing face of the upper side bracket of the aperture cover due to an outward reactional force of the plurality of compression springs and on a clockwise turn of the second rotatable knob, the second cylindrical shaft winds the distal ends of the plurality of ropes to pull the locking pin from the through hole on the stem of the at least one stud of the plurality of spring pressured stud assemblies allowing the plurality of compression springs push up the engagement face of the lower side bracket of the aperture cover due to an upward reactional force of the plurality of compression springs, and thus releases the aperture cover from the aperture.

27. The release arrangement as claimed in claim 23, 24, or 26 wherein the aperture cover when released, falls on an outside of the vehicle or the building if the aperture cover is previously mounted from the outside of the vehicle or the building to cover the aperture in the vehicle or the building.

28. The release arrangement as claimed in claim 23, 24, or 26 wherein the aperture cover when released, falls on an inside of the vehicle or the building if the aperture cover is previously mounted from the inside of the vehicle or the building to cover the aperture in the vehicle or the building.

* * * * *